Oct. 30, 1923.
P. CAPOCCI
COFFEE URN
Filed July 21, 1922
1,472,551
3 Sheets-Sheet 1
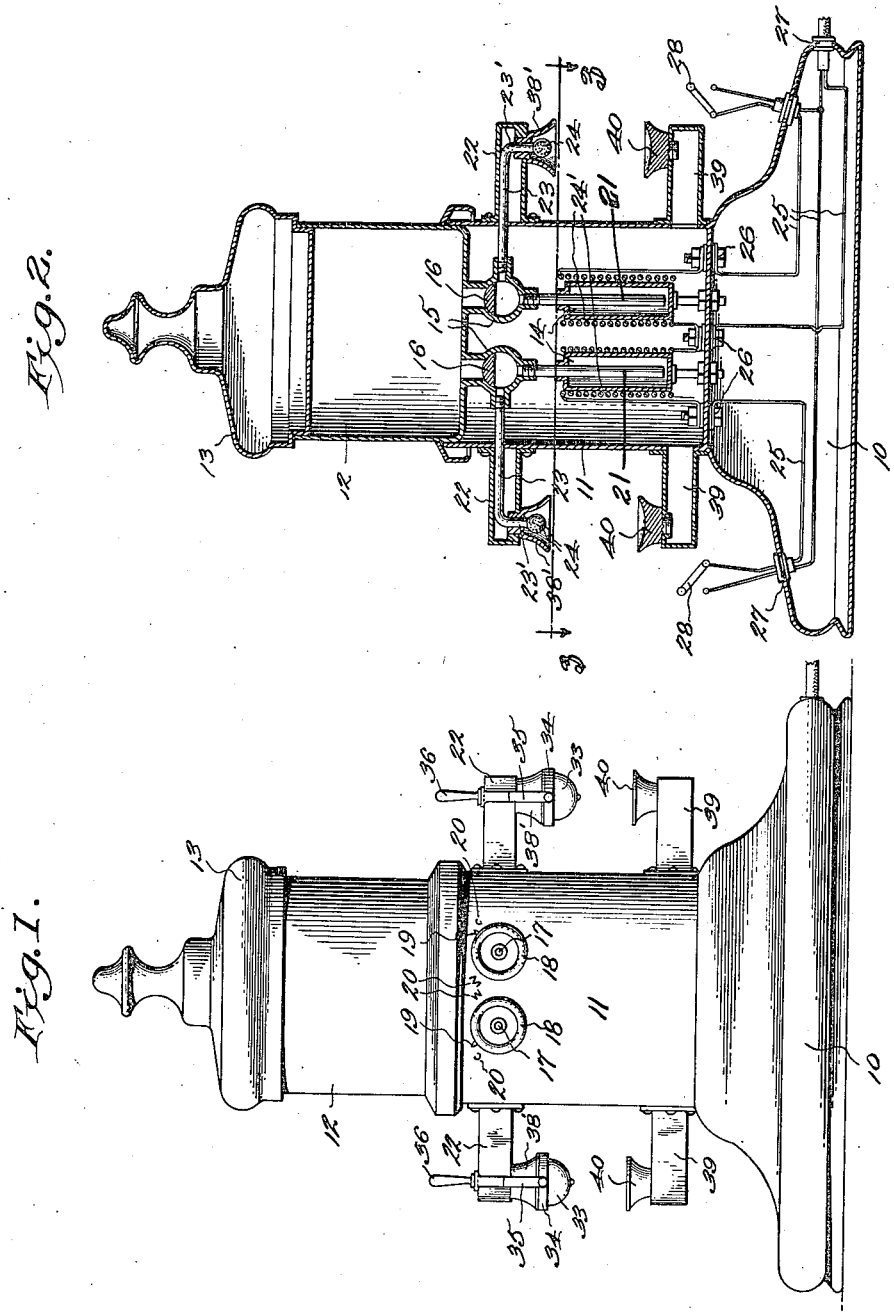
P. Capocci,
INVENTOR
BY Victor J. Evans
ATTORNEY
WITNESSES Oct. 30, 1923.
P. CAPOCCI
COFFEE URN
Filed July 21, 1922
1,472,551
3 Sheets-Sheet 2
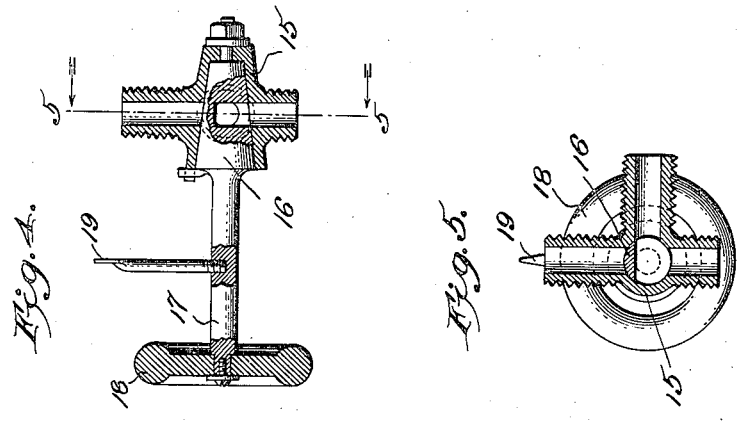
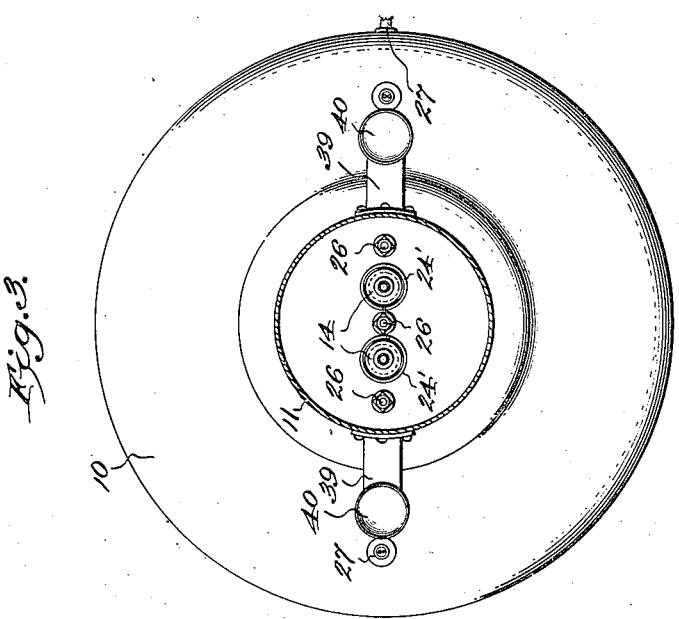

Oct. 30, 1923.
P. CAPOCCI
COFFEE URN
Filed July 21, 1922
1,472,551
3 Sheets-Sheet 3
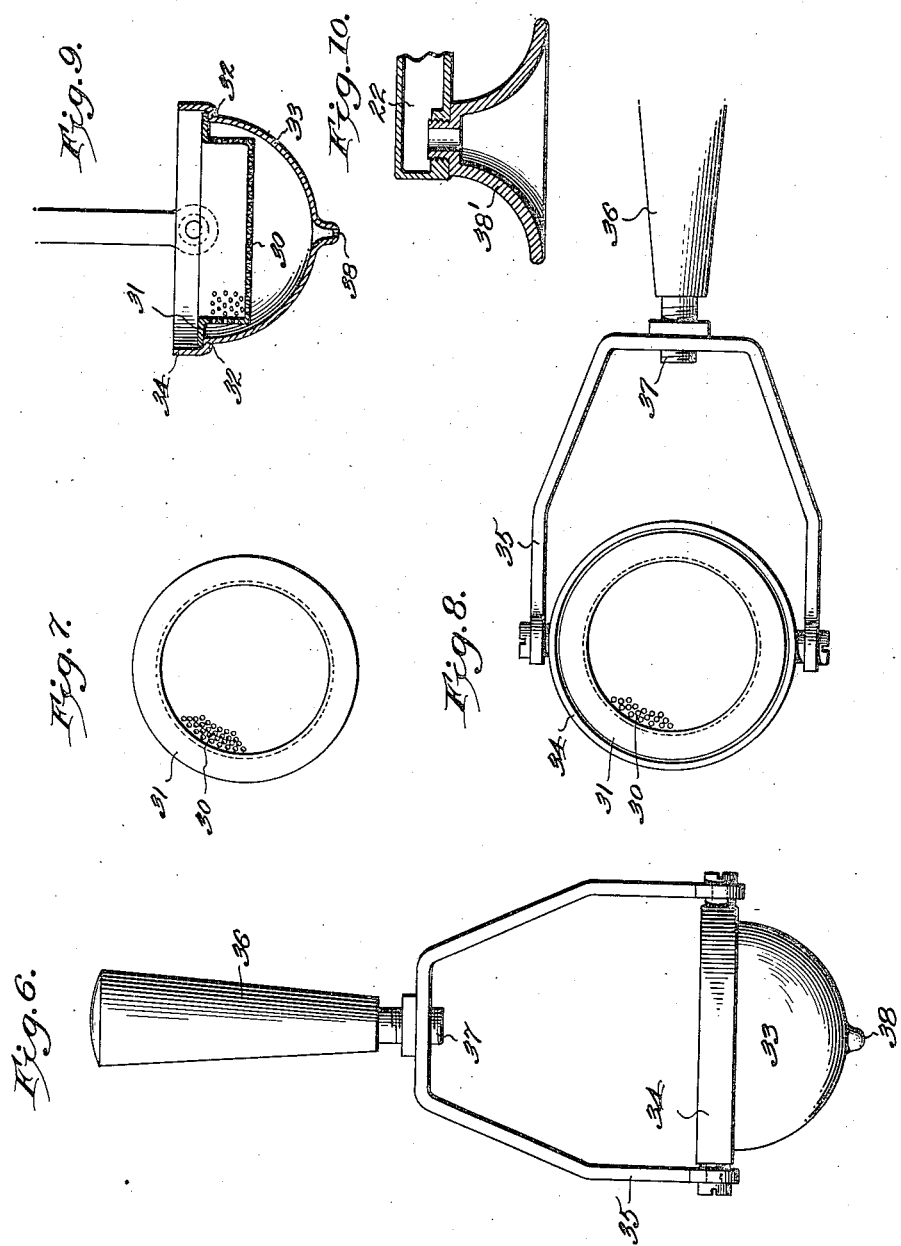

Patented Oct. 30, 1923.

1,472,551

UNITED STATES PATENT OFFICE.

POMPEO CAPOCCI, OF PROVIDENCE, RHODE ISLAND.

COFFEE URN.

Application filed July 21, 1922. Serial No. 576,599.

*To all whom it may concern:*

Be it known that I, POMPEO CAPOCCI, a citizen of the United States, residing at Providence, in the county of Providence and State of Rhode Island, have invented new and useful Improvements in Coffee Urns, of which the following is a specification.

This invention relates to coffee urns, and has for its chief characteristic, the provision of an urn which is very simple in construction, light in weight, and designed so that coffee can be made in the shortest possible time.

More specifically stated, the invention embodies one or more water containers, which is adapted to be heated in any suitable manner, and subsequently conveyed to percolate through the ground coffee and ranged in a receptacle disposed immediately above a cup holder, the coffee percolating through the receptacle directly into the cup as its use is desired, a valve being arranged to control the communication between the water container and the coffee receptacle.

The nature and advantages of the invention will be better understood when the following detailed description is read in connection with the accompanying drawings, the invention residing in the construction, combination, and arragement of parts as claimed.

In the drawings forming part of this application, like numerals of reference indicate similar parts in the several views, and wherein:—

Figure 1 is a view in elevation of the invention.

Figure 2 is a vertical sectional view therethrough.

Figure 3 is a transverse sectional view taken on line 3—3 of Figure 2.

Figure 4 is a detail view of one of the valves.

Figure 5 is a sectional view taken on line 5—5 of Figure 4.

Figure 6 is a detailed view of the coffee container and the receptacle-like support therefor.

Figure 7 is a plan view of the coffee container.

Figure 8 is a plan view of Figure 6.

Figure 9 is a view taken at a right angle to Figure 6.

Figure 10 is a sectional view showing the manner of holding the cover of the receptacle-like support in position.

Referring to the drawings in detail, 10 indicates a hollow base, which supports a cylindrical like body 11 upon the upper end of which receives the water container 12. This container is normally closed by a removable cover 13. It will be noted from an inspection of Figure 1, that the urn in its entirety may be finished to present a very ornamental appearance.

Arranged within the body 11 is one or more water heating receptacles 14, and while I have illustrated two of these receptacles, I desire to have it understood that the urn in its entirety may be of any desired size to accommodate any number of such receptacles. These receptacles 14 are arranged in communication with the water container 12, the bottom of the latter being designed to provide a substantially three-way valve casing disposed immediately above each receptacle 14, and operating in each of these casings indicated at 15 is a rotary valve 16, the stem of which projects through the body 11 and supports a handle 18. Also carried by the stem 17 is a finger 19, which cooperates with indicating characters 20 on the body 11 to enable the user to determine the exact position of the valve. A pipe 21 projects from each casing 15 into the adjacent water receiving receptacle 14 terminating in spaced relation to the bottom thereof, and when the valve 16 is in its opened position, the water from the container 12 is allowed to pass through the receptacle 14. Projecting laterally from the body 11 are hollow arms 22, and received by these arms are outlet pipes 23, which project from the adjacent branches of the casings 15, these pipes having their outer ends turned downwardly as at 23' and perforated as at 24. Subsequent to the heating of the water admitted to the receptacles 14, and the opening of the valves 16, the water is conveyed from the receptacles 14 through the pipes 23, into the coffee container to be hereinafter described.

While the receptacles 14 may be heated in any suitable manner, I preferably surround each receptacle with an electric heater indicated at 24, the heater being substantially of the same height as the receptacle 14, so as to heat the water more or less instantaneously.

The wires 25 for said heaters are arranged within the base 10, and are connected with the terminals 26 of the heater in a manner illustrated. The wires 25 enter the base through an opening 27 at one side thereof, and a switch 28 is connected in each circuit, so that the heaters are independently controlled. A perforated container 30 is employed to receive the ground coffee, and this container is provided with an annular flange 31, which reposes upon a lateral flange 32 of a receptacle-like support 33 which receives the container 30. The flange 32 of this receptacle-like support terminates to provide a vertical flange 34 upon which is pivoted a yoke 35 having associated therewith an adjustable handle 36. This handle has a threaded extension 37 which is threaded through an opening in one end of the yoke 35 for a purpose to be hereinafter described. The lower end of the receptacle-like support 33 is provided with an outlet opening 38. Each of the laterally disposed arms above referred to has associated therewith a cover 38' for the receptacle-like support 33, and these covers are supported and remain stationary with said arms. In using the urn, it is of course necessary to associate the coffee container 30 with the urn, and for this purpose the yoke 35 is swung upon its pivots to straddle the arms 22 in a manner illustrated in Figure 1. The handles 36 are subsequently adjusted to position the receptacle-like support 33 in proper relation to its cover 38, thereby closing the receptacle-like support 33 and also covering the coffee container 30.

Projecting laterally from the body 11 are arms 39, and these arms are arranged parallel with and directly beneath the arms 22, the arms 39 have associated therewith cup supports 40, which are arranged immediately beneath the receptacles 33.

When it is desired to use the urn, the cover 13 is removed from the container 12, and water admitted to the latter, the valves 16 are opened to allow this water to enter the receptacles 14, wherein the water is heated. It is of course understood that the receptacle 33 together with the coffee container 30 is preferably associated with the arms 22 in a manner described and clearly illustrated in Figure 1. After the water has been properly heated, the valves 16 are adjusted to admit this water to be conveyed through the pipes 23, from where the water percolates through the container 31. As the water percolates in the manner stated, the coffee passes from the receptacles 33 through the outlet openings 38 into the cups arranged upon the supports 40. The communication between the container 12 and the receptacles 14, and between the latter and the pipes 23 can be conveniently controlled by the valves 16.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A coffee urn comprising a base, a body portion, a water container arranged above the body portion, water receiving receptacles arranged within the body of the urn and having communication with the water container, means for heating the water receptacles, a container for the ground coffee, means for conveying the water from the receptacles to said coffee containers, and valves controlling the communication between the water container and said receptacles and between the latter and said coffee containers.

2. A coffee urn comprising a base, a body portion, a water container supported thereon, water receiving receptacles arranged within the body portion, electric heating devices surrounding said water receptacles and individually controlled, a ground coffee container supported by the urn for each receptacle and means for conveying the water from the receptacle to said container, and a valve controlling the communication between the water container and each water receptacle and between the latter and the coffee containers.

3. A coffee urn comprising a base, a body portion supported thereon, a water container associated with the body portion, water receiving receptacles arranged within the body portion and communicating with said container, a valve for each receptacle and arranged to control the communication between the latter and said container, arms projecting laterally from the body portion, a ground coffee container supported by each arm, means for heating the water in said receptacles, means for conveying the hot water from the receptacle to the adjacent coffee containers, and said valve controlling said communication.

4. A coffee urn comprising a base, a body portion, a water container supported by the body portion, water receiving receptacles arranged within the body portion, and communicating with said water container, a valve for each receptacle and arranged to control said communication, means for heating the water admitted to said receptacles, arms projecting laterally from the body portion, a container adapted to receive ground coffee, a receptacle-like support receiving each container, means for associating said support with one of said arms, means for conveying the hot water from the receptacles to said coffee containers and said valves controlling the communication between the water receptacles and said coffee containers.

5. A coffee urn comprising a base, a body portion, a water container supported thereon, water receptacles arranged in the body portion, and communicating with said container, valves controlling said communication, means for heating the water admitted to said receptacles, arms projecting laterally from the body portion, ground coffee containers, a receptacle-like support for each of the latter mentioned containers, a yoke pivoted on each of said receptacle-like supports and adapted to suspend the latter from one of said arms, said support having an outlet opening, a cup support disposed immediately beneath the coffee container and its support, means for conveying the hot water from the receptacles and said coffee containers.

6. A coffee urn comprising a base, a body portion, a water container supported on said body, water receiving receptacles arranged within said body and communicating with said container, valves controlling said communication, arms projecting laterally from the body portion, a ground coffee container, a receptacle-like support for said container, means for associating one of said supports and container with each arm, said receptacle-like support having an outlet opening, a cup support carried by the body portion and arranged beneath each arm, a supply pipe arranged in each arm for conveying the hot water from the adjacent receptacle to one of said coffee containers, and said valves controlling the communication between the water receptacles and said passages.

7. A coffee urn comprising a base, a body portion, a water container supported thereby, water receptacles arranged within the body portion and communicating with said container, valves controlling said communication, arms projecting laterally from the body portion, ground coffee containers, a receptacle-like support for each coffee container, a pivoted yoke associated with each receptacle-like support and adapted to straddle all of said arms, a cover for said receptacle-like support carried by said arm, means associated with the yoke for adjusting the receptacle-like support with relation to its cover, said support having an outlet opening, means for heating the water admitted to the water receptacles, means for conveying the heated water from the receptacles to said coffee containers, said valves controlling the communication between the water receptacles and said coffee containers, and cup supports projecting from the body of the urn and disposed immediately beneath said arms.

In testimony whereof I affix my signature.

POMPEO CAPOCCI.